3,020,293
PROCESS FOR THE MANUFACTURE OF OLEFIN OXIDATION PRODUCTS FROM OLEFIN-MERCURY COMPLEXES
Manfred Schönberg, Rudolf Wirtz, and Therese Quadflieg, all of Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 19, 1960, Ser. No. 23,156
Claims priority, application Germany Apr. 24, 1959
14 Claims. (Cl. 260—348.5)

The present invention relates to a process for the manufacture of olefin oxidation products.

Numerous processes are known according to which ethylene oxide is produced in the gaseous phase by direct oxidation of ethylene with oxygen or air in the presence of silver catalysts. The disadvantage of all these processes consists in that about one third of the ethylene used is oxidized to yield carbon dioxide and water and that the ethylene oxide is obtained in so low a concentration that its separation from the cycle gas is difficult and expensive. The unsatisfactory yield is due to the fact that at the required, relatively high reaction temperature the velocity of the combustion reaction to carbon dioxide can be compared with that of the formation reaction of ethylene oxide. Said processes cannot be carried out at lower temperatures since in this case the yields are too small and the concentration of ethylene oxide in the product is too low.

Furthermore, it is known to use a vanadium oxide catalyst instead of the silver catalyst. In this case the process is carried out at a temperature in the range from 500 to 600° C. When said process is carried out at atmospheric pressure no ethylene oxide is formed and only carbon dioxide is obtained. Under a pressure of 200 mm. abs. of mercury carbon dioxide and ethylene oxide are simultaneously formed in about equal quantities. Consequently, considerably lower pressures must be applied in order to obtain higher yields of ethylene oxide. Hence, very large units are necessary and the throughputs are very low.

It is likewise known to produce olefin oxides by reacting olefins with metal salts to obtain olefin-coordination compounds which are then oxidized with gaseous oxygen at a temperature in the range from 204 to 538° C. In this reaction only one oxygen atom of the oxygen molecule is bound to the olefin, while the other oxygen atom oxidizes the metal salt to a compound containing oxygen, which must be reduced before it can again be reacted with olefin.

All these processes require molecular oxygen for the oxidation of the olefin to the corresponding olefin oxide. Thus, the effluent gas may contain free oxygen in addition to the olefin oxidation products, which fact is extremely dangerous on account of the large explosion ranges of the olefin oxides.

It is also known to react bound oxygen, as it is present, for example, in nitrogen dioxide ($NO_2$) or copper oxide (CuO), by the method of Kubierschky in columns with methane. In this process at most traces of ethylene oxide are formed.

Furthermore, it is known to produce olefin-coordination compounds from platinum or palladium salts and to decompose said coordination compounds with water. However, in this reaction only aldehydes are formed. Olefin oxides have not been obtained in this manner.

It is likewise known additively to combine olefins with mercury compounds in aqueous or alcoholic solution. On boiling some of these addition compounds undergo an oxydo-reduction; the olefin is oxidized and the mercury is reduced to the metal. The corresponding glycols are obtained from the propenyl compounds, trimethyl ethylene is converted into acetaldehyde and acetone and tetrahydroquinoline is oxidized to yield quinoline. In no case, however, has a formation of olefin oxides been observed.

The special advantage of the process of the present invention resides in thefact that olefin hydrocarbons containing one or several double bonds can be oxidized to the corresponding olefin oxides without the use of molecular oxygen or activated oxygen in the oxidation.

The process of the invention is carried out as follows: A mercury-olefin compound is prepared from an olefin and a mercuric salt and then reacted at elevated temperature in an alkaline or neutral medium in a liquid aqueous phase. The olefin-mercury complex compound reacts with the water to yield olefin oxidation products containing olefin oxides, without a special oxidizing agent being used. Thus, in this process the effluent gases cannot contain free oxygen in addition to olefin oxidation products.

The present process is carried out at a pH value above 7, for example in the range from 8 to 14 and advantageously in the range from 10 to 13. It can be realized under reduced pressure, preferably, however, at atmospheric pressure or under elevated pressure; a pressure in the range from 0.1 to 10 atmospheres gauge being especially suitable.

In principle the process can be performed at any temperature below the critical temperature of the solution. It is of advantage, however, to operate at a temperature in the range from 70° C. to 300° C. An especially suitable variant of the process of the invention is carried out at a temperature ranging from 100° C. to 150° C. The lower temperature limit is given by the reaction velocity that becomes too low and the upper limit by the critical temperature of the solution.

If a temperature is applied which is above the boiling point of the solution it is necessary to operate under pressure in order to avoid evaporation of the solution. It can likewise be suitable, however, to operate under pressure already at a temperature below the boiling point of the solution or below 100° C.

In some cases it is suitable to add inert salts, whereby, for example, the reaction velocity can be influenced. The solutions may be admixed with organic solvents which are either miscible or immiscible with water. In the latter case it is possible either to operate in separate layers, for example a liquid hydrocarbon is disposed above the aqueous solution, or advantageously an intensive mechanical mixing is produced, for example by means of a stirrer or a vibro-mixer. These steps serve to increase the dissolving power for the olefin.

As organic solvents which are well miscible with water and considerably increase the boiling temperature of the solution glycol and glycerin are particularly mentioned.

As inert salts there are preferably added alkali metal carbonates or bicarbonates such as lithium carbonate, lithium bicarbonate, sodium carbonate, sodium bicarbonate, potassium carbonate and potassium bicarbonate. There may likewise be added other inorganic compounds such as primary, secondary and tertiary alkali metal phosphates, especially lithium, sodium and potassium phosphates, the sulfates of lithium, sodium, potassium, beryllium, magnesium, aluminum, manganese, iron, nickel, copper, zinc and calcium, the chlorides of lithium, sodium, potassium, calcium, magnesium and aluminum, furthermore sodium thiosulfate, potassium thiocyanate and the hydroxides of lithium, sodium, potassium, and barium. The addition of organic salts, such as sodium acetate, potassium acetate and other water-soluble alkali metal salts of carboxylic acids and organic sulfoacids may likewise be suitable, above all if the addition of these compounds reduces the surface tension of the water and/or increases the dissolving power for the olefin. Furthermore, there may be used mixtures of inert salts with one another or with organic solvents. The addition of inert salts is especially important when the process is to be carried out at a temperature above 100° C. and without the application of superatmospheric pressure. In this case the solubility of the salt used must be so high that it increases considerably the boiling point of the solution, for example by 10 to 50° C. Therefore, salts are preferred the solubility of which in water amounts to at least 100 g. per liter of solution.

The mercury-olefin coordination compound is produced by admixing the olefin with a mercury compound. As olefins there can be used the normal olefins such as ethylene, propylene, butylene or the olefins of said series containing a higher number of carbon atoms, for example octene or dodecene. Alternatively, mixtures of olefins and olefin-containing gases can be used, as obtained, for example, in the low or high temperature pyrolysis (in the latter case after the removal of acetylene). There are likewise suitable mixtures of olefins with other inert gases such as hydrogen, carbon monoxide, methane, ethane, propane, butane and higher hydrocarbons as well as olefin- and especially ethylene-containing coke oven gases which have preferably been freed by a prepurification from hydrogen sulfide and carbon dioxide. Gases containing ethylene oxide, propylene oxide and butylene oxide are obtained from ethylene, propylene and butylene, respectively, i.e., the number of carbon atoms in the oxide obtained is the same as in the initial olefin.

It is likewise possible to use diolefins such as propadiene, butadiene, isoprene and the diolefines containing a large number of carbon atoms for the formation of the mercury-olefin coordination compounds. The process of the invention can also be carried out with cyclic hydrocarbons containing one or several double bonds, such as cyclohexene and the homologs thereof. Of course, double bonds which belong to an aromatic ring are excluded.

Butadiene is reacted, for example, to yield butadiene oxide and cyclohexene to yield cyclohexene oxide.

The mercury-olefin-complex compounds required in the reaction are preferably prepared by adding an olefin to the aqueous solution or suspension of a mercury salt.

The bivalent mercury required for the complex formation can either be bound to inorganic radicals or to organic radicals. As inorganic mercury-(II)-compounds there are mentioned the sulfate, oxide, hydroxide, carbonate, bicarbonate, nitrate, nitrite, fluoride, chloride, bromide, sulfite, cyanide, hydroxycyanide, thiocyanate, perchlorate and chlorate of mercury. The two latter compounds are less suitable on account of the possible formation of explosive mixtures.

In some cases the salt only enters into solution by additives. Thus mercuric sulfide which is difficultly soluble in water can be brought into solution by potassium sulfide, mercuric iodide by potassium iodide and the basic mercury sulfate by ethylene.

As examples for suitable organic mercury-(II)-compounds there are mentioned mercury acetate and the salts with other carboxylic acids and the derivatives thereof, furthermore the salts of isocyclic sulfonic acids and the derivatives thereof. Moreover, there are suitable solutions of mercuric oxide or carbonate in organic solvents as far as water is present, such as the solution of mercuric oxide in an aqueous solution of acetamide.

In the process of the invention there can furthermore be used all mercury-organic compounds that are soluble in water or water-containing solvents. Especially mentioned are the aqueous alcohol solutions in which the olefin absorption takes place very rapidly with the formation of mercury alkoxy-alkyl compounds.

As mercury-organic-compounds there are mentioned by way of example methyl-mercuric fluoride, alkyl-mercuric hydroxides and alkyl-mercuric salts (especially methyl-mercuric nitrate which is very readily soluble in water), phenyl-mercuric salts with organic and inorganic acids, olefin-dimercuric chlorides, ethanol-mercuric salts, ethylether-mercuric salts and the analogous compounds with higher olefins.

In this case, too, the compound can be insoluble in pure water and only rendered soluble by the addition of acids, salts, alkalies or organic substances; for example the p-amino-phenyl mercuric acetate which is insoluble in water but readily soluble in dilute acids, dilute alkalies and in aqueous aniline-acetate solution. Reference is also made to mercury dimethyl aniline which is soluble in cold dilute hydrochloric acid and to mercury-bis-salicylic acid which is insoluble in water, but soluble in aqueous alkalies.

The absorption of the olefin preferably takes place at a temperature in the range from 0° C. to 90° C. For the manufacture of a mercury sulfate-ethylene complex compound, for example, an aqueous suspension of mercuric sulfate is shaken at room temperature in an ethylene atmosphere and thus transformed into a water-soluble mercuric sulfate-ethylene complex compound. The olefin can also be additively combined with a dry mercuric compound. In this case the evolved heat must be removed by an effective external cooling so that the formed mercuric complex is not decomposed by overheating. The complex compounds can be prepared in an especially simple manner by introducing an olefin into the solution or suspension of an organic or inorganic mercuric salt.

Suitable solvents are water, aqueous salt solutions such as solutions of potassium bicarbonate, potassium carbonate, magnesium sulfate or solutions of mixtures of various salts, solutions of organic substances in water, such as aqueous amide solutions and mixtures of water with organic solvents, for example alcohol-water mixtures, glycerin-water mixtures or glycol-water mixtures.

In the manufacture of the mercury-olefin complex compounds it is of advantage to operate at a pH value below 7 at slightly elevated temperatures, preferably in the range from 30° C. to 90° C. and under atmospheric or elevated pressure, suitably in the range from 0.5 to 100 atmospheres gauge in order to attain a greater velocity of formation of the complex compound. The reaction velocity can be considerably increased by finely distributing the gases, for example by means of sieves or frits or by shaking and stirring the liquid.

Each of these steps can be carried out either alone or in combination with one another.

For the manufacture of the olefin oxide the mercury-olefin coordination compound must be decomposed in the presence of water in a liquid phase at a pH value above 7, preferably in the range from 8 to 14.

The pH value which shall not be below 7 is very decisive since otherwise no olefin oxide can be formed. Moreover, the presence of water is absolutely necessary, since the oxygen required for the formation of the olefin oxide is taken from the water. Besides the olefin oxides varying amounts of aldehydes and polyhydric alcohols are formed. Thus ethylene yields in addition to ethylene oxide also acetaldehyde and glycol and propylene yields in addition to propylene oxide also acrolein.

Simultaneously with the oxidation of the olefin the mercury contained in the complex compound is reduced to the metallic state. The presence or the occurrence of metallic mercury does not impair the reaction.

The reaction of the mercury-olefin complex compound with water only takes place at elevated temperature. It is preferably brought about at a temperature in the range from 70° C. to 300° C.

In order to avoid hydrolysis of the formed olefin oxide to the corresponding glycol the former must be rapidly withdrawn from the reaction space.

For this purpose it can be advantageous to introduce superheated steam into the reaction solution. Scavenging of the reaction space with inert stripping gases such as nitrogen, noble gases and gaseous saturated hydrocarbons has also proved to be very suitable. The gas can be directly introduced into the reaction solution. In some cases it is sufficient only to scavenge the gas space above the reaction liquid. It is especially advantageous to use for stripping the olefin which is contained in the mercury-olefin complex compound. It may likewise be possible to use a mixture of the olefin with oxygen as stripping gas, but on account of the danger of explosion oxygen or oxygen-containing gas mixtures—such as air—should only be used if the temperature of the reaction solution is below 200° C. and preferably between 70° C. and 150° C.

Unreacted olefin that escapes together with the waste gas can be recycled after the separation of the reaction products and the addition of the required amount of fresh gas.

The charge of the mercuric salt with the olefin and the oxidation of the olefin to olefin oxide can be carried out either in two different vessels or in one vessel.

The following examples serve to illustrate the invention but they are not intended to limit it thereto.

*Example 1*

148 grams of mercury-(II)-sulfate were suspended in 500 cc. of cold water and dissolved by introducing ethylene. The limpid solution was admixed with 65 grams of sodium carbonate. The solution was filled into a reaction tube having a length of 2 m. and a diameter of 2 cm., which tube could be heated from the outside and was well insulated against the radiation of heat, and heated to nearly the boiling point.

Through a frit at the lower end of the reaction tube 1 liter of ethylene was passed per hour through said catalyst solution. At the upper end the tube was enlarged to form an abating vessel on which a reflux condenser was mounted.

On the first day of the reaction the effluent gas contained 2.0% by volume of acetaldehyde in addition to 0.05% by volume of ethylene oxide and on the second day 60.57% by volume of acetaldehyde in addition to 0.54% by volume of ethylene oxide.

*Example 2*

The procedure of Example 1 was carried out in a manner such that instead of ethylene 1 liter of nitrogen was passed per hour through the solution. The solution was heated to a temperature such that the mercury-ethylene complex compound reacted with water to yield acetaldehyde and ethylene oxide.

On the first day of the reaction the effluent gas was free from actealdehyde and contained 0.05% by volume of ethylene oxide and on the second day the waste gas contained 6.3% by volume of acetaldehyde and 0.18% by volume of ethylene oxide.

*Example 3*

148 grams of mercury-(II) sulfate were suspended in 500 cc. of water and dissolved at 80° C. by introducing propylene. The limpid solution was admixed with 65 grams of sodium carbonate.

In an apparatus as described in Example 1 the solution was heated to the boil and 1 liter of propylene was bubbled through per hour.

The effluent gas contained:

On the first day 0.84% by volume of propylene oxide and 8.2% by volume of acrolein,
On the second day 0.43% by volume of propylene oxide and 10.1% by volume of acrolein,
On the third day 0.83% by volume of propylene oxide and 7.2% by volume of acrolein.

*Example 4*

148 grams of mercury-(II) sulfate were suspended in 500 cc. of cold water and dissolved by introducing ethylene. The limpid solution obtained was admixed with 65 grams of sodium carbonate.

The solution was filled into a reaction tube having a length of 2 m. and a diameter of 2 cm. The lower end of the reaction tube was provided with a Jena glass frit G3 through which gas could be introduced. At the upper end of the tube an abating vessel of 1 liter capacity and thereabove a water-cooled reflux condenser were mounted. The reaction tube was surrounded by a heating oil jacket and a glass wool insulation. At a heating oil temperature of 140° C. a mixture of 4 liters of ethylene and 1 liter of oxygen was passed per hour through the catalyst solution.

After two days of reaction the effluent gas contained 1.80% by volume of ethylene oxide and after three days 2.0% by volume of ethylene oxide. In the course of the fourth day the effluent gas contained 3.65% by volume of ethylene oxide in addition to acetaldehyde and small amounts of carbon dioxide. The gas was analyzed by chromatography.

*Example 5*

90 grams of mercury-(II)-ethylene-carbonate complex compound were heated to the boil in an apparatus as described in Example 1 in 1000 cc. of a saturated, alkali metal carbonate-containing salt solution having a boiling point of 120° C. and a pH of 11.6, and through the solution 2 liters of nitrogen were passed per hour. The effluent gas contained 6.3% by volume of ethylene oxide in addition to 3.3% by volume of acetaldehyde.

When 2 liters of ethylene was passed through the solution per hour instead of nitrogen the waste gas contained 14.2% by volume of ethylene oxide in addition to 8.7% by volume of acetaldehyde.

We claim:
1. A process for the manufacture of an olefin oxide having a carbon chain length of 2 to 12 carbon atoms which comprises reacting, with water at a pH value between 7 and 14 and at a temperature in the range from 70 to 300° C. in a liquid aqueous phase, a complex compound of (1) an olefinic hydrocarbon of corresponding carbon chain length which is unsaturated by at most two olefinic groups and (2) a compound selected from the group consisting of a mercuric salt, mercuric oxide and mercuric hydroxide.

2. A process as defined in claim 1, wherein the pH of the liquid aqueous phase is in the range from 8 to 14.

3. A process as defined in claim 1, wherein the pH of the liquid aqueous phase is in the range from 10 to 13.

4. A process as defined in claim 1, wherein the reaction temperature is in the range from 100° C. to 150° C.

5. A process as defined in claim 1, wherein the reaction is carried out under a pressure in the range from 0.1 to 10 atmospheres gauge.

6. A process as defined in claim 1, wherein the liquid aqueous phase contains a dissolved inert salt to increase its boiling point.

7. A process as defined in claim 5, wherein the inert salt is an alkali metal carbonate.

8. A process as defined in claim 1, wherein the mercuric salt is mercuric sulfate.

9. The process as defined in claim 1, wherein an inert stripping gas is passed through the liquid aqueous phase to withdraw the olefin oxide therefrom.

10. The process as defined in claim 9, wherein the stripping gas is the same olefin as the olefin of the starting complex compound.

11. The process as defined in claim 9, wherein the stripping gas is a mixture of oxygen with the same olefin as the olefin in the complex compound.

12. A process as defined in claim 9, wherein the inert stripping gas is nitrogen.

13. A process for the manufacture of ethylene oxide which comprises introducing ethylene into a suspension of mercuric sulfate in water to form an aqueous solution of a complex mercuric sulfate-ethylene compound, adjusting the resulting solution to a pH value between about 8 and 13, heating the solution to a temperature in the range from 70 to 300° C., and passing ethylene through said solution to withdraw from it ethylene oxide formed therein.

14. A process for the manufacture of propylene oxide which comprises introducing propylene into a suspension of mercuric sulfate in water to form an aqueous solution of a complex mercuric sulfate-propylene compound, adjusting the resulting solution to a pH value between about 8 and 13, heating the solution to a temperature in the range from 70 to 300° C., and passing propylene through said solution to withdraw from it propylene oxide formed therein.

No references cited.